United States Patent
Amenduni Gresele (10) Patent No.: US 11,780,487 B2
(45) Date of Patent: Oct. 10, 2023

(54) BABY ROCKING DEVICE ADAPTED TO IMPART A CYCLIC RECIPROCATING ROCKING MOVEMENT TO A PERAMBULATOR, PUSH-CHAIR OR THE LIKE

(71) Applicant: MEDIKA S.R.L., Vicenza (IT)

(72) Inventor: Massimo Amenduni Gresele, Vicenza (IT)

(73) Assignee: MEDIKA S.R.L., Vicenza (IT)

( * ) Notice: Subject to any disclaimer, the term of this patent is extended or adjusted under 35 U.S.C. 154(b) by 97 days.

(21) Appl. No.: 17/419,981

(22) PCT Filed: Jan. 8, 2020

(86) PCT No.: PCT/IB2020/050117
§ 371 (c)(1),
(2) Date: Jun. 30, 2021

(87) PCT Pub. No.: WO2020/144593
PCT Pub. Date: Jul. 16, 2020

(65) Prior Publication Data
US 2022/0061549 A1  Mar. 3, 2022

(30) Foreign Application Priority Data

Jan. 8, 2019 (IT) .......................... 102019000000169

(51) Int. Cl.
*A47D 9/04* (2006.01)
*B62B 9/22* (2006.01)
*A47D 9/02* (2006.01)
*B62B 9/08* (2006.01)

(52) U.S. Cl.
CPC .................. *A47D 9/04* (2013.01); *A47D 9/02* (2013.01); *A47D 9/057* (2022.08); *B62B 9/22* (2013.01); *B62B 9/087* (2013.01)

(58) Field of Classification Search
CPC .......... A47D 9/04; A47D 9/053; A47D 9/057; A47D 9/02; A47D 9/00; A47D 9/012;
(Continued)

(56) References Cited

U.S. PATENT DOCUMENTS 10,173,711 B1 *   1/2019  Correa ...................... B62B 9/22
2016/0101803 A1 * 4/2016  Ahlemeier ................ B62B 9/08
                                                                       180/167

FOREIGN PATENT DOCUMENTS

DE           10321129 A1      4/2005
DE       102017112278 A1 *  12/2018  ............... B62B 9/22
(Continued)

OTHER PUBLICATIONS

"Roll." Merriam-Webster.com Dictionary, Merriam-Webster, https://www.merriam-webster.com/dictionary/roll. Accessed Dec. 8, 2022. (Year: 2005).*
(Continued)

*Primary Examiner* — David R Hare
*Assistant Examiner* — Deborah Talitha Gedeon
(74) *Attorney, Agent, or Firm* — Heslin Rothenberg Farley & Mesiti P.C.; Victor A. Cardona, Esq.

(57) ABSTRACT

A baby rocking device, adapted to impart a reciprocating cycling rocking movement to a perambulator, push-chair or the like, comprising a single roller, having an electric motor arranged inside the roller, the roller configured for rolling on a floor. The roller includes an inner non-rotating core having two ends portions projecting from opposite ends of the roller and connected to two receiving and supporting members configured for receiving two respective wheels of the perambulator or push-chair, so that the perambulator or push-chair is placed astride the single roller, and a cylindrical outer shell for contact with the floor, which is rotatably mounted on the inner core. The electric motor is carried by the inner core and is provided for actuating the rotation of the outer shell alternately in two opposite directions of (Continued)

rotation, so as to cause rolling of the single roller on the floor alternately in two opposite directions.

11 Claims, 5 Drawing Sheets

(58) Field of Classification Search
CPC .......... A47D 9/016; A47D 9/008; A47D 1/08;
A47D 3/005; A47D 13/10; B62B 9/22;
B62B 9/00; B62B 9/08; B62B 9/12;
B62B 9/082; B62B 9/085; B62B 9/087;
A47C 3/0251; A61H 1/003; A63G 9/16;
A63G 13/00
See application file for complete search history.

(56) References Cited

FOREIGN PATENT DOCUMENTS

| EP | 1145671 A2 | * | 10/2001 | ............. A47D 13/10 |
|----|---|---|---|---|
| GB | 2231005 A | | 11/1990 | |
| KR | 20160017590 A | | 2/2016 | |
| SE | 1400114 A1 | | 9/2015 | |
| WO | WO-8900942 A1 | * | 2/1989 | |

OTHER PUBLICATIONS

International Search Report and Written Opinion of the International Searching Authority for International Application No. PCT/IB2020/050117 dated May 4, 2020.

* cited by examiner

BABY ROCKING DEVICE ADAPTED TO IMPART A CYCLIC RECIPROCATING ROCKING MOVEMENT TO A PERAMBULATOR, PUSH-CHAIR OR THE LIKE

CROSS REFERENCE TO RELATED APPLICATIONS

This application is a national stage filing under section 371 of International Application No. PCT/IB2020/050117, filed on Jan. 8, 2020, published in English on Jul. 16, 2020 as WO 2020/144593 A1 and which claims priority to Italian Application No. 102019000000169, filed on Jan. 8, 2019, the entire disclosure of these applications being hereby incorporated herein by reference.

FIELD OF THE INVENTION

The present invention relates to baby rocking devices, adapted to impart a cyclic reciprocating rocking movement to a perambulator, push-chair or the like.

The invention relates in particular a baby rocking device of the type comprising:
- at least one receiving and supporting member configured for receiving and supporting at least one element, such as a wheel, of the perambulator or push-chair, and
- an actuation member for causing a reciprocating cyclic movement of said at least one receiving and supporting member on a floor.

PRIOR ART

Various forms of baby rocking devices of the above indicated type have been proposed since long. Baby rocking devices of this type are for example described and illustrated in documents GB-A-2 231 005, SE 1 400 114 A1, KR 2016 0017590 A, DE 103 21 129 A1. These known solutions all have the drawback of being relatively complicated and not very reliable and/or purely efficient in operation.

OBJECT OF THE INVENTION

The object of the present invention is that of providing a baby rocking device which is simple, reliable and functional.

SUMMARY OF THE INVENTION

In view of achieving this object, the invention provides a baby rocking device of the type having the features indicated at the beginning of this description and further characterized in that said actuation member is constituted by a single roller, having an electric motor arranged inside the roller and configured for rolling on the floor alternately in two opposite directions,
  said single roller including:
    a non-rotating inner core, having two end portions projecting from opposite ends of the roller and connected to two receiving and supporting members configured for receiving two respective wheels of the perambulator or push-chair, so that the perambulator or push-chair is placed astride said single roller, and
    a cylindrical outer shell for contact with the floor, which is rotatably mounted on said inner core,
  said electric motor being carried by said inner core and being configured for actuating the rotation of said outer shell alternately in two opposite directions of rotation, so as to cause rolling of said single roller on the ground, alternately in two opposite directions.

Due to the above indicated features, the baby rocking device according to the invention is extremely simple and functional, since it is substantially constituted simply by a roller which rolls on the floor with a reciprocating motion, and which has a known-inner core connected to the members which receiving and support the wheels of the perambulator or push-chair.

Other preferred features of the invention are indicated in the annexed dependent claims.

BRIEF DESCRIPTION OF THE DRAWINGS

Further features and advantages of the invention will become apparent from the description which follows with reference to the annexed drawings, given purely by way of non-limiting example in which.

DETAILED DESCRIPTION OF PREFERRED EMBODIMENTS

In the drawings, numeral 1 generally designates a baby rocking device comprising an actuation member 2 in the form of a motorized roller.

Figure 2:
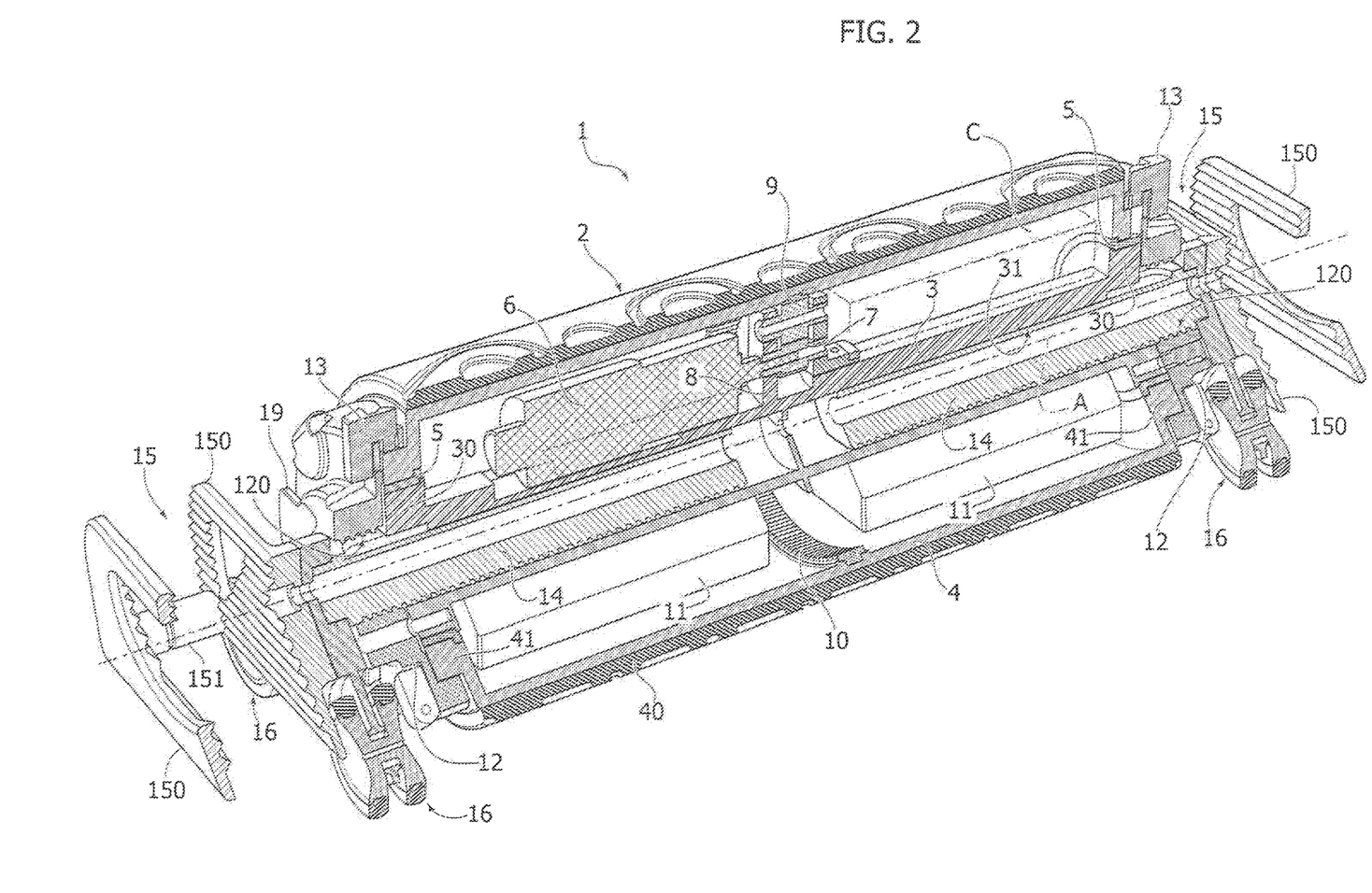
FIG. 2 is a cross-sectional perspective view of the baby rocking device of FIG. 1.

With reference in particular to FIG. 2, the motorized roller 2 includes a central non-rotating core 3 having a tubular cylindrical body, whose axis is designated by A. On core 3 there is rotatably mounted an outer cylindrical shell 4 which is provided with a coating 40, for example made of rubber, having an outer surface which is for rolling on the floor and is preferably configured with a thread surface having formations of any shape adapted to increase friction between the shell of the roller and the floor, so as to nullify or render any how minimum the risk of sliding whit respect to the floor.

In the illustrated example, the shell 4 is rotatably mounted on core 3 by means of a pair of sliding bearings 5 made of a material with low friction coefficient (such as PTFE).

An electric motor 6 is mounted outside the non-rotating central core 3 and is rigidly connected thereto. The motor 6 is mounted with its axis parallel to axis A of roller 2 within the annular cavity defined between the central core 3 and the rotating shell 4. The electric motor 6 is configured for actuating the rotation of the shell 4 by means of a first pinion 7 which is connected in rotation with the output shaft of the electric motor 6 and is rotatably mounted on a supporting structure 8 rigidly connected to the central non-rotating core 3. The structure 8 also rotatably supports a second pinion 9 which meshes both with pinion 7 and with a crown 10 with the inner teeth which is rigidly connected to the inner surface of the rotating shell 4. Within the annular cavity defined between the central core 3 and the shell 4 there are also housed electric batteries 11 for supplying the electric motor 6, and which are removably connected to the central core 3, along with an electronic controller (not shown in the drawings).

At each of its ends, the rotating shell 4 includes an annular front wall 41 with a central circular aperture within which there is received a respective sliding bearing 5, for rotatably supporting the shell 4 on end annular flanges 30 of the central non-rotating core 3. The illustration in FIG. 2 is merely diagrammatic. Although this figure does not show this detail, at least one of the two front walls 41 of the rotating shell 4 is removably connected to the cylindrical body of the shell 4, for enabling the space inside shell 4 to be accessed.

Adjacent to each of the two end front walls 41 of the rotating shell 4, there is rotatably mounted an annular body 12, acting as a nut-like member, having a central threaded hole 120. On the body of each nut member 12 there is radially slidably mounted to a locking member 13 which is movable between a radially outer position, which is a release position, and a radially inner position in which it connects in rotation the respective nut member 120 with the rotating shell 4.

The central non-rotating core 3 is in the form of a cylindrical tubular body, with an axial cylindrical cavity 31 within which there are slidably mounted two shafts 14 having respective portions projecting on opposite sides from the ends of the motorized roller 2. Each of the shafts 14 has an outer surface with a threaded portion which is screwed within the threaded hole 120 of the respective nut member 12.

The ends of the two shafts 14 projecting from the opposite ends of the motorized roller 2 are removably connected to two structures 15 for supporting and receiving two respective wheels of a perambulator or push-chair. Each structure 15 is provided with wheels 16 (or alternatively with sliding pads).

The structures 15 which are for receiving and supporting the wheels of a perambulator or push-chair are configured and dimensioned so that when the wheels 16 are in contact with the floor, the outer surface of the coating 40 of the rotating shell 4 is pressed in contacts with the floor.

Figure 1:
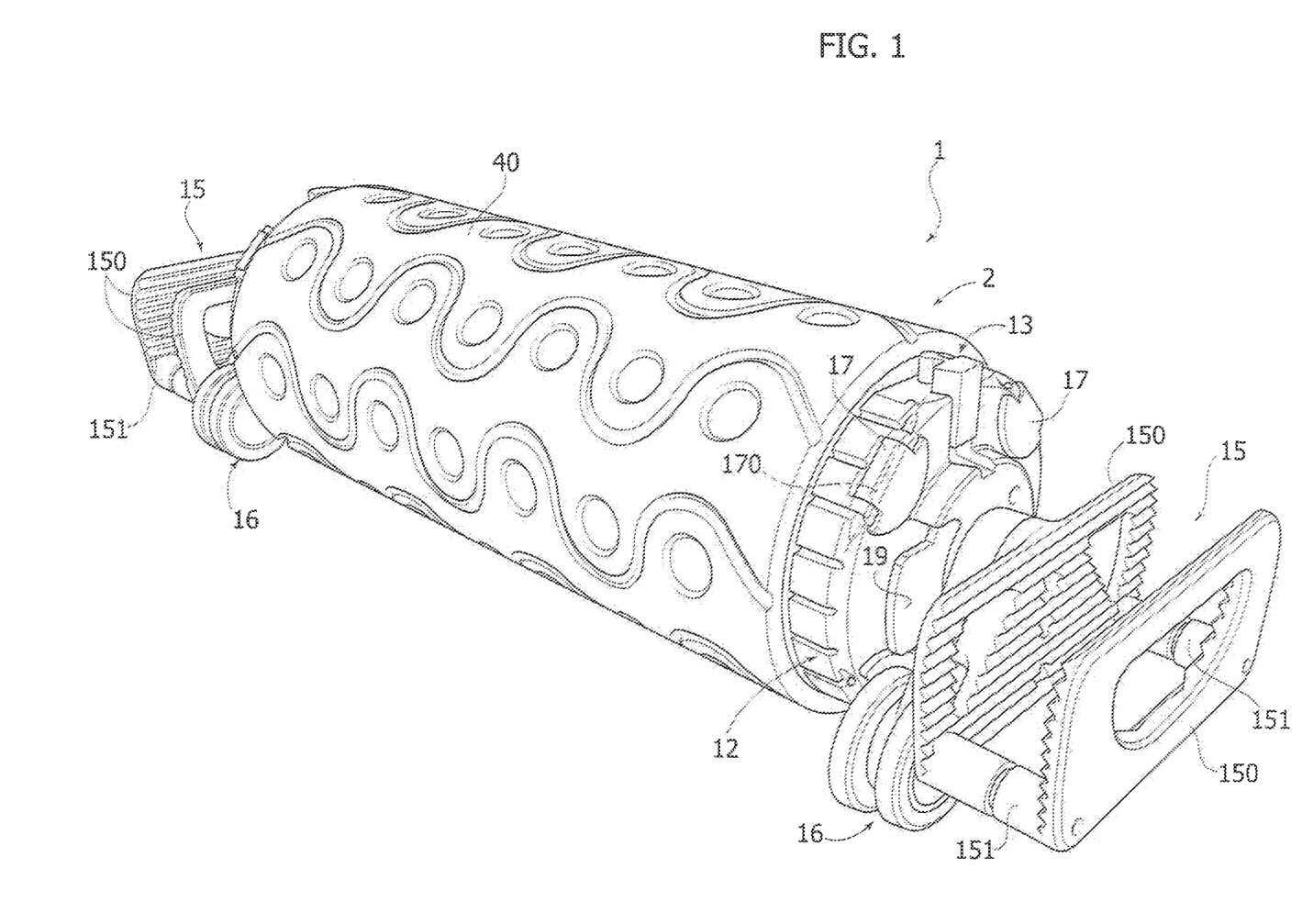
FIG. 1 is a perspective view of a preferred exemplary embodiment of the push-chair according to the invention.

As shown in FIGS. 1, 2, in the embodiment shown each structure 15 has two wings 150 which are connected to each other at the bottom by two cross-members 15 spaced apart from each other. The distance between cross-members 151 is selected so that it is anyway lower than the diameter of a wheel of a perambulator or push-chair. In this manner, the wheel of the perambulator or push-chair is received between the two wings 150 and is supported above the two cross-members 151, in a position in which it is not in contact with the floor.

The baby rocking device described in the foregoing has a first operation mode which is the following.

The two structures 15 which are for receiving and supporting the two wheels of the push-chair or perambulator are preliminarily arranged at a distance corresponding to the distance between the front or rear wheels of the perambulator or push-chair. The device 1 can be provided with any adjustment system, adapted to enable an adjustment of distance between the structures 15 for receiving the wheels of the perambulator or push-chair. An adjustment device which is particularly preferred will be described in the following. The perambulator or push-chair is arranged with its two front or rear wheels above the receiving and supporting structures 15.

In the above-mentioned first operation mode, the locking member 13 is in its released position, so that the rotation of the shell 4 is not transmitted to the nut members 12 arranged at the ends of the motorized roller.

Once that the push-chair rests with two of its wheels above the structures 15, these wheels are kept spaced apart from the floor, whereas the coating 40 of the rotating shell 4 is pressed in friction contact with the floor. The electric motor 6 of the motorized roller 2 can be actuated by means of a remote control connected through a wireless connection of any type to the electronic controller arrange inside the roller.

The electronic controller is programmed so as to control a cyclic rotation, alternately in opposite directions, of the output shaft of the electric motor 6 so as to cause a resulting cyclic rotation, alternately in opposite directions, of the shell 4. The motorized roller 2 performs accordingly a series of reciprocating cycling rolling movements, in opposite directions, which causes a resulting reciprocating cyclic movements, in opposite directions, of the perambulator or push-chair whose wheels are supported on the two structures 15.

Naturally, the electronic circuit can be programmed for enabling both an adjustment of the rolling speed of the roller 2 and an adjustment of the rolling travel in one direction and the other.

Furthermore, the remote control may comprise a safety device in a form of a dead man button for interrupting the movement of the motorized roller. Similarly, an emergency button may be provided on the device 1 at any position which is easily accessible for the user.

On each of the nut members 12 there are further provided member for perturbation of the rolling movement, designated in the drawing by reference numeral 17. Each of these members is in the form of a tab pivotally mounted around a tangential axis 170 on the periphery of the respective nut member 12. Each tab 17 is movable between a rested position (shown in FIG. 1) and an operative position, rotated by 180° C. around the respective axis 170, in which this tab projects beyond of the outer singular profile of the coating 40 of the shell 4. In this manner, during rolling of the motorized roller 2, the elements 17 positioned in their projecting operative position, cause cyclic bumps of the roller 2 and consequently of the perambulator or push-chair whose wheels are received and supported on structures 15.

Figure 3:
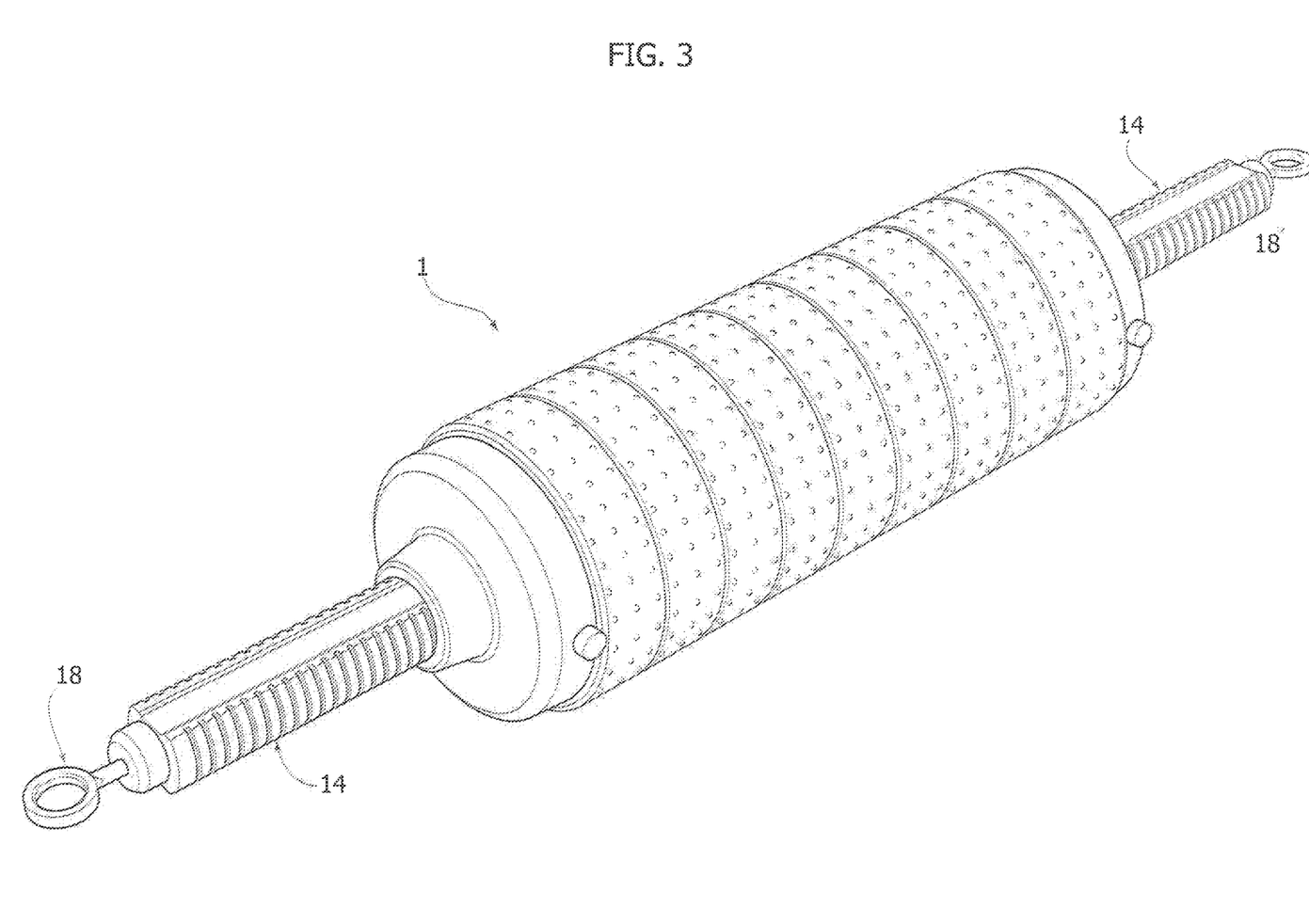
FIG. 3 is a perspective view of the baby rocking device in a different configuration.
Figure 4:
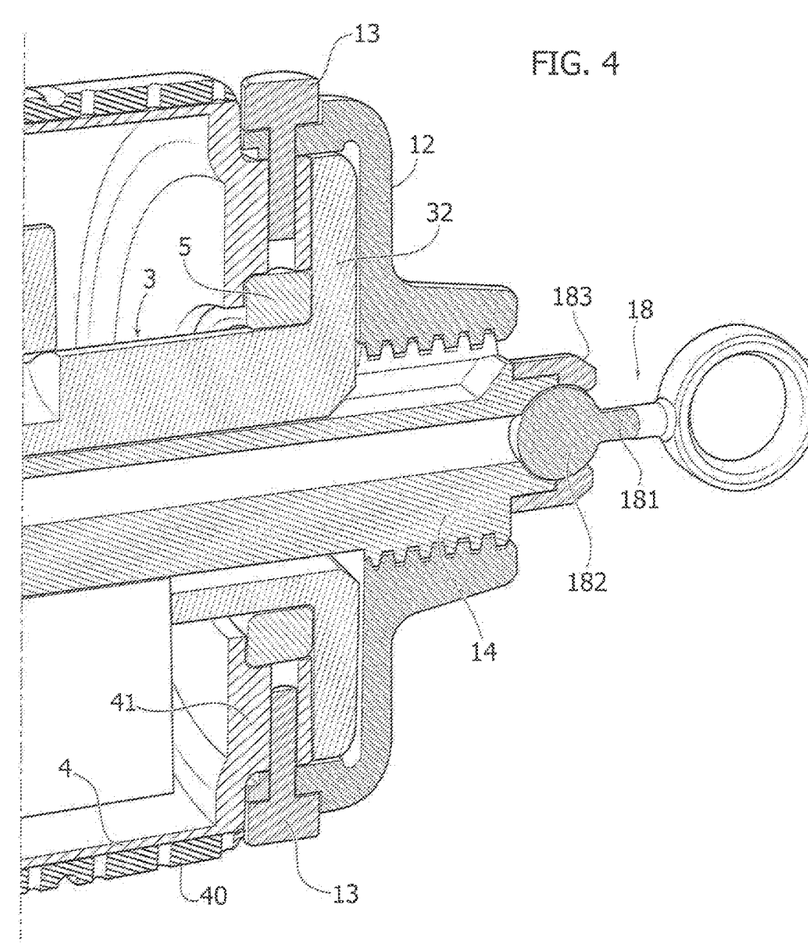
FIG. 4 is a partial view in cross-section of the device in the configuration of FIG. 3.

FIGS. 3, 4 show a second operation mode of the baby rocking device 1. In this operation mode, the two structures 15 for receiving the wheels of the perambulator or push-chair are removed and in their place, above the opposite ends of the two shafts 14 there are mounted two hook elements 18. In the example of FIGS. 3, 4, each hook element 15 is in the form of a ring 180 carried by a stem 181 of a ball head 182 which is held on a respective end of a shaft 14 through a threaded locking ring 183 screwed on one end portion of the shaft 14. The above-mentioned arrangement is such to provide a spherical joint which enables to orient the hook ring 180 at wheel.

FIG. 4 corresponds in substance to the embodiment of FIG. 2, also if defers therefrom in some details of construction. In the second operation mode, the locking device 13 (in the solution of FIG. 4 there are provided two locking devices 13 which are diametrically opposite to each other) is in its locking position in which the respective nut member 12 is connected in rotation with the end hole 41 of the rotating shell 4. The detail of FIG. 4 shows also an end flange 32 of the central non-rotating core 3 on which the nut member 12 is rotatably mounted.

As indicated in the foregoing, in the second operation mode the locking devices 13 are in their locked position (FIG. 4) so that each nut member 12 rotates together with the shell 4. The rotation of the nut member 12 causes a corresponding axial movement of the respective shaft 14.

In this second operation mode, the electronic controller of the electric motor 6 is programmed for imparting to this motor cyclic rotations alternately in opposite directions. The two nut members 12 therefore perform rotations alternately in opposite directions which cause a reciprocating axial movements of the two shafts 14. As a result of this, in this operation mode, the two hook elements 18 carried by the opposite ends of the two shafts 14 (see FIG. 3) are displaced alternately in opposite directions. The orientation of the threads of the two nut members 12 and the threaded portions of the two shafts 14 is such as to give rise to specularly symmetrical movements of the two shafts 14.

In this operation mode, the device 1 as used as a tie-end push-rod device, with a hook element 18 connected (such as by means of knotted cord) to any part of the perambulator or push-chair, and the other hook device 18 is connected to any fixed part (such as a table leg). The connections of the hook elements 18 to the respective connection parts must be relatively rigid, so that when the electric motor 6 is activated, the device 1 can alternately act as a pool and a push element, for imparting a reciprocating movement to the perambulator or push-chair, which rolls on its own wheels. In this operation mode, the device can be also used for moving a baby cot.

It is finally to be observe which in the first operation mode corresponding to the configuration of FIG. 1, it is necessary to ensure that the nut members 12 do not rotate. To this end, device 1 comprises a further locking device 19 (see FIGS. 1, 2) which is movable between a locking position and a release position. In the locking position it rigidly connects each nut member 12 to the respective structure 15.

The device used for adjusting the distance between the two structures 15 which receive and support the wheels of the perambulator or push-chair may be of any type. In the case of the above disclosed embodiment, the locking members 13 may be temporarily brought to their locking position only to enable adjustment of the distance between the structures 15 by activating the electric motor 6. It has been shown, when the locking device 13 is in its locking position, the rotation of the motor is transmitted to the two nut members 12 which cause a corresponding axial symmetrical movement of the two shafts 14, in one direction of the other, depending upon the direction of rotation of the electric motor.

Figure 5:
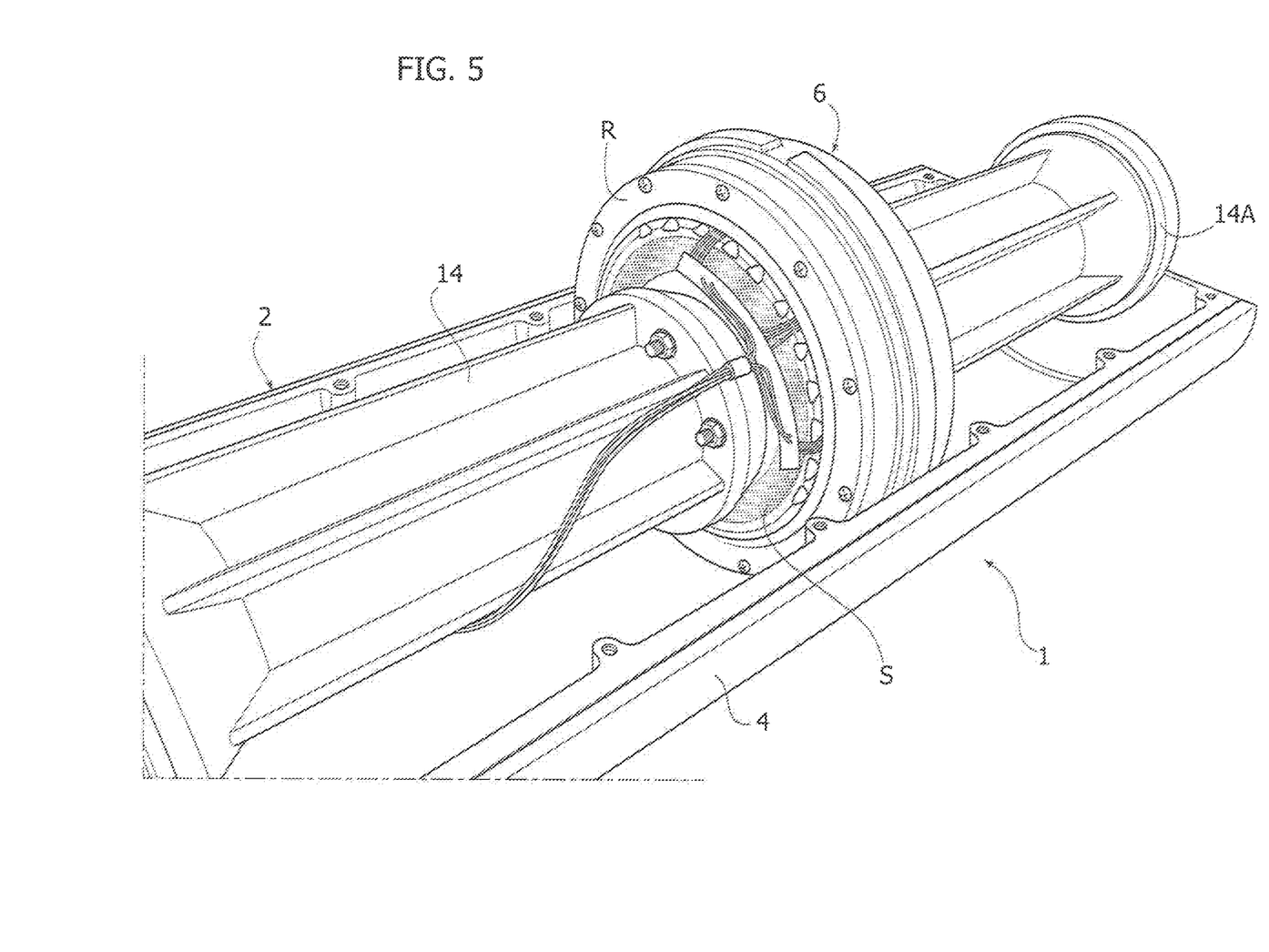
FIG. 5 shows a variant.

FIG. 5 shows a variant in which the electric motor 6 is mounted coaxially to the roller 2 and has a stator S carried by a single axial structure 14 which constitutes the non-rotating part of roller 2 and an annular rotor R rotatable around stator S and rigidly connected to the inner surface of the cylindrical structure of shell 4. This figure does not show the members 15 for supporting the wheels of the perambulator or push-chair, which are to be rigidly connected to the ends 14A of the axial non-rotating structure 14.

Naturally, while the principle of the invention remains the same, the details of construction and the embodiments may widely vary with respect to what has been described and illustrated purely by way of example, without departing from the scope of the present invention.

The invention claimed is:

1. A baby rocking device adapted to impart a reciprocating cycling rocking movement to a baby carriage or push-chair, in which said baby rocking device comprises:
   at least one receiving and supporting member configured for receiving and supporting at least one wheel of the baby carriage or push-chair, and
   an actuation member for causing a horizontal cyclic reciprocating movement of said at least one receiving and supporting member relative to a floor,
   said actuation member comprising a single roller having an electric motor arranged inside the roller and configured for rolling on the floor alternately in two opposite horizontal directions,
   said single roller including an inner non-rotating core having two end portions projecting from opposite ends of the roller and an outer cylindrical shell for contact with the floor, said outer cylindrical shell rotatably mounted on said inner non-rotating core,
   said two end portions connected to two receiving and supporting members of the at least one receiving and supporting member configured for receiving two respective wheels of the baby carriage or push-chair, in such a way that the two respective wheels are astride said single roller, and
   said electric motor being carried by said inner core and being configured for actuating the rotation of said outer shell alternately in two opposite directions of rotation, so as to cause the rolling of said single roller on the floor, alternately in two opposite horizontal directions.

2. The baby rocking device according to claim 1, wherein said inner core carries two shafts projecting axially from opposite ends of said single roller and are connected to said receiving and supporting members.

3. The baby rocking device according to claim 2, wherein said shafts are largely mounted within an axial cavity of the inner core for adjustment of the distance between said receiving and supporting members.

4. The baby rocking device according to claim 2, wherein: said shafts have threaded portions engaged within nut members which are rotatably mounted at the two ends of the motorized roller around a roller axis, the motorized roller is provided at each end with a first locking member, which is selectively movable between a locking position, in which a respective nut member is connected in rotation with the outer cylindrical shell of the motorized roller and a release position, so that when said first locking members are in their locking positions, said electric motor is able to control alternate axial and specularly symmetrical movements of said shafts through a rotation of said nut members, said receiving and supporting members being removably connected to said shafts so that they can be replaced with two hook elements for hooking said shafts respectively to a first part and a second part to be moved cyclically and reciprocatingly relative to each other.

5. The baby rocking device according to claim 4, wherein said baby rocking device further comprises a second locking member at each end of the motorized roller which is selectively movable between a locking position, in which a respective nut member is rigidly connected to a respective receiving and supporting member, and a release position.

6. The baby rocking device according to claim 1, wherein the outer cylindrical shell is provided with at least one perturbing member for perturbating the rolling movement of the motorized roller said at least one perturbing member being movable between a rest position, in which said at least one perturbing member does not project from the shell and an operative position, in which said at least one perturbing member projects from the shell so that said at least one perturbing member causes jumps during rolling of the motorized roller.

7. The baby rocking device according to claim 1, wherein said inner non-rotating core and said cylindrical shell define an annular space therebetween in which there are housed said electric motor, one or more batteries for supplying the electric motor and an electronic control circuit.

8. The baby rocking device according to claim 7, wherein said electric motor is arranged with a motor axis thereof parallel to a roller axis of the motorized roller and said electric motor controls the rotation of said cylindrical shell by means of a first pinion mounted on the output shaft of the electric motor and under a second pinion which meshes both with said first pinion and with a crown with inner teeth which is rigidly connected to the inner surface of said rotating cylindrical shell.

9. The baby rocking device according to claim 1, wherein said electric motor is controlled by an electronic controller arranged in a space defined between said inner core and said rotating cylindrical shell, said electronic controller being programmed for activating a reciprocating cyclic rotation, in two opposite directions, of the electric motor.

10. The baby rocking device according to claim 9, further comprising a remote control device, connected in a wireless mode to said electronic controller and a safety device for interrupting operation of the electric motor.

11. The baby rocking device according to claim 1, further comprising a single electric motor arranged coaxially with the roller handing a stator carried by a single non-rotating axial structure, and an annular rotor rotatable around the stator and rigidly connected to the inner surface of a cylindrical structure constituting the shell.

\* \* \* \* \*